United States Patent [19]

Indo

[11] Patent Number: 4,731,580

[45] Date of Patent: Mar. 15, 1988

[54] DISPLACEMENT SENSING DEVICE WITH TWO MAGNETORESISTANCE ELEMENT SECTIONS USED INDEPENDENTLY

[75] Inventor: Kenji Indo, Hadano, Japan

[73] Assignee: Sokkisha Co., Ltd., Tokyo, Japan

[21] Appl. No.: 755,273

[22] Filed: Jul. 15, 1985

[30] Foreign Application Priority Data

Aug. 30, 1984 [JP] Japan .............................. 59-131558[U]

[51] Int. Cl.[4] ........................ G01N 7/14; G01R 33/02; H01L 43/08
[52] U.S. Cl. ................................... 324/208; 324/252; 338/32 R
[58] Field of Search ..................... 324/207, 208, 252; 338/32 R

[56] References Cited

U.S. PATENT DOCUMENTS 3,643,039  2/1972  Barcomb et al. .
4,429,276  11/1984  Narimetsu et al. ................. 324/207
4,594,548  6/1986  Tahahashi et al. ................. 324/208

FOREIGN PATENT DOCUMENTS 2935319  3/1980  Fed. Rep. of Germany .
3308352  9/1983  Fed. Rep. of Germany .
3126806  11/1983  Fed. Rep. of Germany .

Primary Examiner—Reinhard J. Eisenzopf
Assistant Examiner—Walter E. Snow
Attorney, Agent, or Firm—Frishauf, Holtz, Goodman & Woodward

[57] ABSTRACT

A displacement sensing device includes a sensor of magnetoresistance elements located opposite to a magnetic scale, and is adapted to measure a relative amount of movement between the magnetic scale and the sensor through the use of a variation in a resistive value of the magnetoresistance elements due to the effect of a magnetic pattern on the magnetic scale. The sensor includes magnetoresistance element sections comprised of a first pair of magnetoresistance elements and a second pair of magnetoresistance elements of a pitch different from that of the first pair of magnetoresistance elements. The magnetoresistance element sections are selectively used in accordance with the pitch of the magnetic pattern on the magnetic scale.

2 Claims, 8 Drawing Figures

F I G. 1
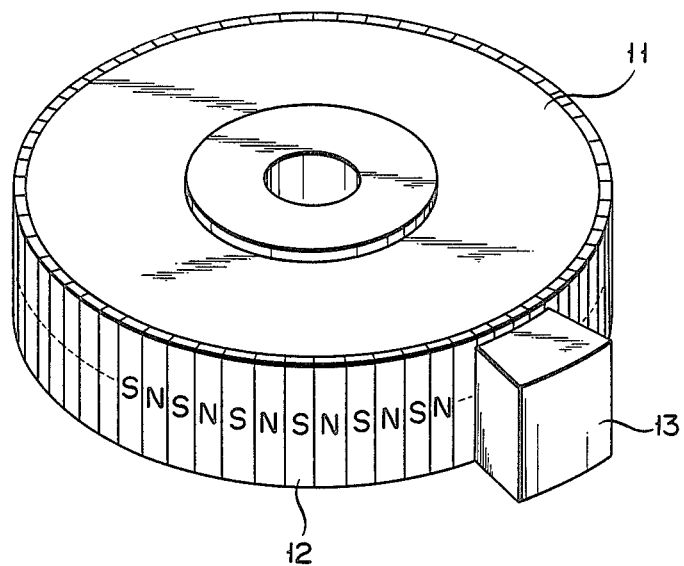

DISPLACEMENT SENSING DEVICE WITH TWO MAGNETORESISTANCE ELEMENT SECTIONS USED INDEPENDENTLY

BACKGROUND OF THE INVENTION

This invention relates to an improved measuring apparatus which includes magnetoresistance elements arranged opposite to a scale, such as a magnetic type rotary scale or a linear scale, and is adapted to measure a relative amount of movement between the scale and the magnetoresistance element array through the utilization of a variation in the resistive value of the magnetoresistance elements due to the effect of a magnetic pattern on the magnetic scale.

A measuring apparatus is known which measures the amount of rotation, movement, etc., of an object. This type of measuring apparatus has been utilized in various fields thanks to its high accuracy and, recently, it has been applied to the field of automatic control. The apparatus includes a magnetic pattern of a given pitch type and a sensor arranged opposite to the magnetic scale. With either the magnetic scale or sensor fixed, and the other connected to a moving object the measuring apparatus can measure the amount of movement of the object by electrically processing a signal which is obtained from the sensor when the object is moved.

In this case, magnetoresistance element sections include magnetoresistance elements arranged at a pitch corresponding to the pitch of the magnetic pattern on the magnetic scale. The measuring apparatus generates an electric signal corresponding to the amount of movement through the utilization of a variation in the resistive value of the magnetoresistance element due to the effect of the magnetic pattern on the magnetic scale.

In the above-mentioned measuring apparatus, the pitch of the magnetic pattern on the magnetic scale is determined in accordance with a resolution on measurement. The magnetoresistance elements of the sensor are arranged to have a pitch corresponding to the pitch of the magnetic pattern. That is, the pitch of the magnetic pattern must have a mutually corresponding relation to the pitch of the magnetoresistance elements.

For this reason, when a plurality of kinds of magnetic scales of different resolutions are to be used, it is necessary to prepare a plurality of kinds of sensors having magnetoresistance elements arranged at a pitch corresponding to the pitch of the magnetic pattern on the respective scale. This often results in a complex measuring operation.

SUMMARY OF THE INVENTION

It is accordingly the object of this invention to provide a measuring apparatus including a plurality of magnetoresistance element sections of magnetoresistance elements with their pairs arranged in a mutually different pitch. When the plurality of magnetoresistance element sections are selectively used in accordance with the pitch of the magnetic pattern on a magnetic scale, the measuring apparatus can be applied to a plurality of kinds of magnetic scales on a single sensor by selectively using the plurality of magnetoresistance element sections in accordance with the pitch of the magnetic pattern on the magnetic scale. Thus, measurement can be performed with good operability.

According to this invention there is provided a measuring apparatus including a magnetic scale with a magnetic pattern of a given pitch, and a sensor located opposite to the magnetic scale and having a magnetoresistance element section with magnetoresistance elements arranged at a pitch corresponding to the pitch of the magnetic pattern, in which an electric signal corresponding to a relaitve amount of movement between the magnetic scale and the sensor is generated through the utilization of a variation in a resistive value of the magnetoresistance element due to the effect of the magnetic pattern on the magnetic scale. The sensor includes a plurality of magnetoresistance element sections having pairs of magnetoresistance elements arranged in a mutually different pitch. The magnetoresistance element sections are selectively used in accordance with the pitch of the magnetic pattern on the magnetic scale.

BRIEF DESCRIPTION OF THE DRAWINGS

A measuring apparatus according to one embodiment of this invention will be explained with reference to the accompanying drawings, in which:

FIG. 1 is an outer view showing the apparatus as applied to a rotary scale of a magnetic type;

DETAILED DESCRIPTION OF THE PREFERRED EMBODIMENTS

An apparatus of this invention as applied to a magnetic type rotary scale will be explained in more detail by referring to the accompanying drawings. In FIG. 1, a rotary scale 11 is adapted to be rotationally driven in interlock with a rotating body, not shown, to be measured as an amount of rotation. A magnetic pattern 12 of a given cycle or pitch is formed on the outer periphery of the rotary scale 11. A sensor 13 is fixedly held opposite to the outer periphery of the rotary scale 11.

Figure 2:
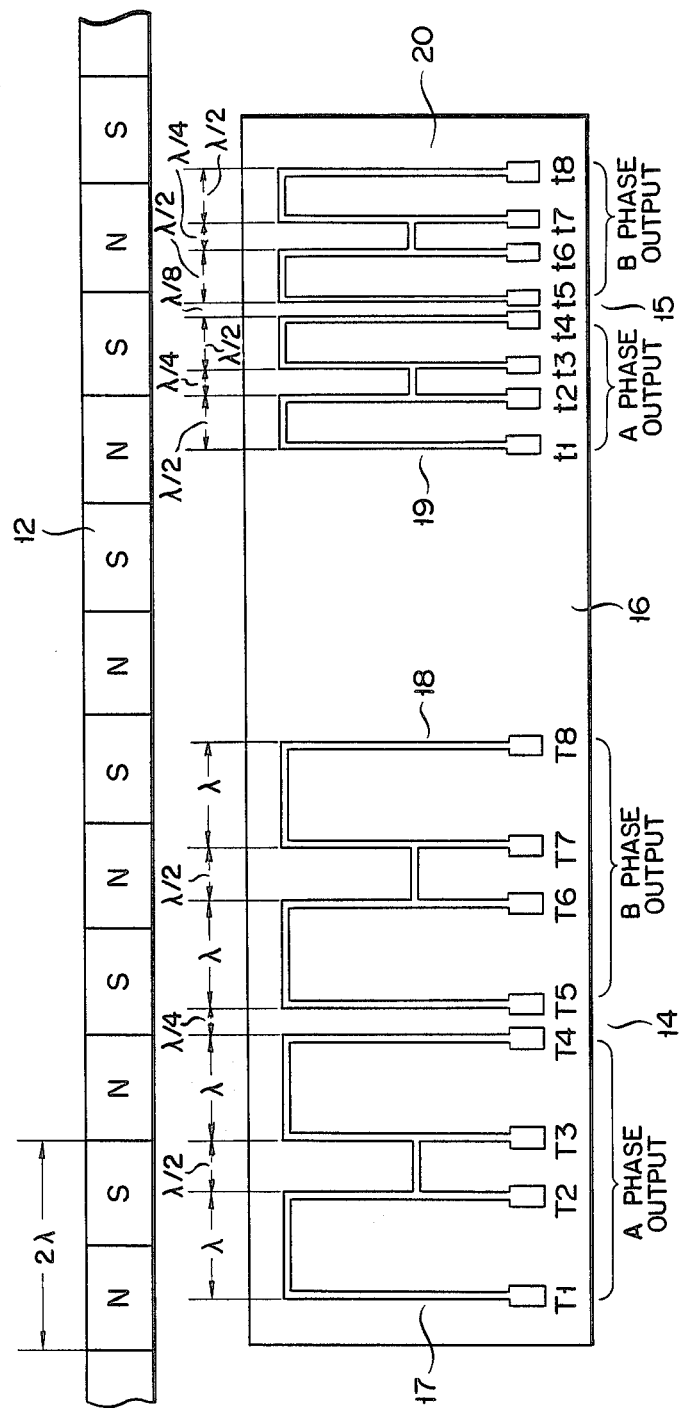
FIG. 2 is a plan view showing a major part of the apparatus of this invention.

The sensor 13 includes, as shown in FIG. 2, a first magnetoresistance element section 14 and a second magnetoresistance element section 15. The first and second magnetoresistance sections 14 and 15 are formed as a ferromagnetic thin film on an insulating substrate 16, such as glass, by a sputtering or an evaporation method, with the use of Ni, Ni-Fe alloy, Co, etc. This process is followed by an etching process to form the pattern as shown in FIG. 2.

Now suppose that $2\lambda$ represents one cycle of the magnetic pattern 12 on the rotary scale 11. In this case, the first magnetoresistance element section 14 is formed such that magnetoresistance elements 17 and 18 of the pitch $\lambda$ are arranged in a pair at an interval of $\lambda/4$. An A-phase signal (a sine wave signal) and B-phase signal (a cosine wave signal) of different cycles are output from the magnetoresistance elements 17 and 18, respectively.

On the other hand, the second magnetoresistance element section 15 is formed such that magnetoresistance elements 19 and 20 of a pitch $\lambda/2$ are arranged in a pair at an interval of $\lambda/8$. The A-phase signal (a sine wave signal) and B-phase signal (a cosine wave signal) of different cycles are output from the magnetoresistance elements 19 and 20, respectively. That is, the ratio between the pitch $\lambda$ of the magnetoresistance elements 17 and 18 in the first magnetoresistance element section 14 and a pitch $\lambda/2$ of the magnetoresistance elements 19 and 20 in the second magnetoresistance element section 15 has an integer progression relation (a two-fold relation in this embodiment). For this reason, a resolution of a meaurement on the second magnetoresistance element section 15 has a two-fold relation to a resolution of a measurement on the first magnetoresistance element section 14.

Figure 3:
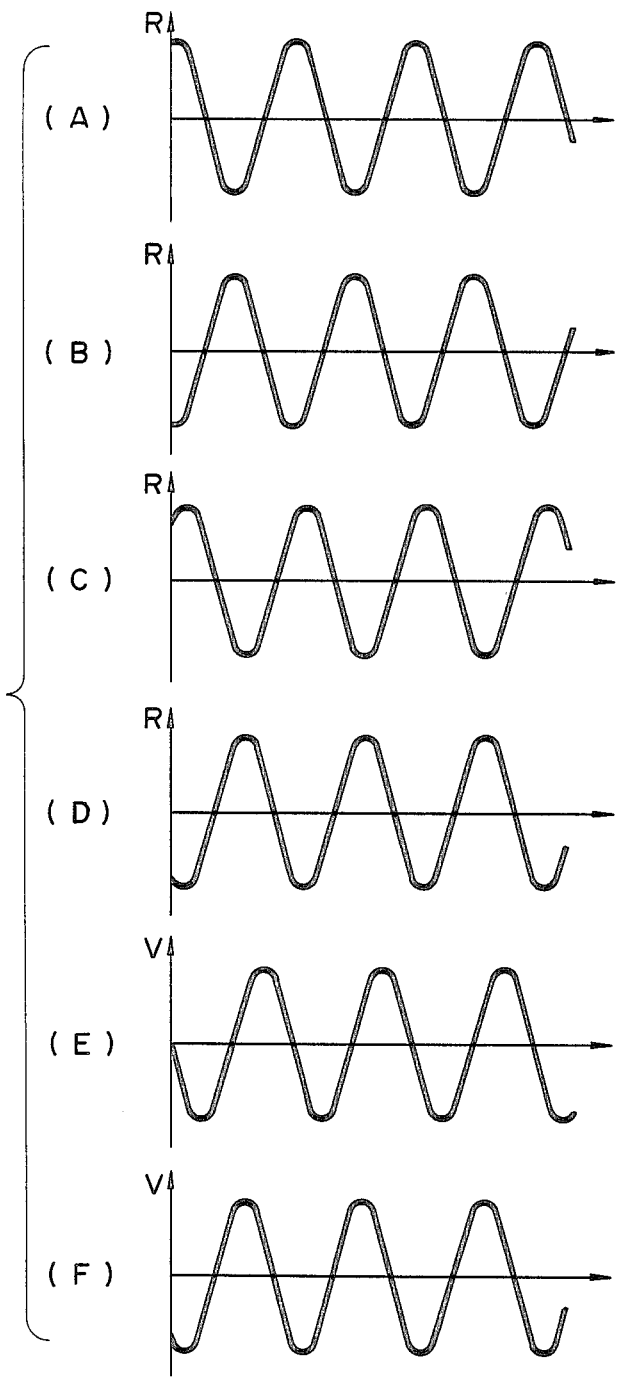
FIGS. 3A to 3F are waveforms for explaining the operation of the apparatus of this invention.

When the rotary scale 11 is rotated, a resistive value R between the terminals T1 and T2 in the magnetoresistance element 17 varies, as shown in FIG. 3A, due to the effect of the magnetic pattern 12. Similarly, a resistive value R between terminals T3 and T4 of the magnetoresistance element 17, resistive value R between terminals T5 and T6 of the magnetoresistance element 18 and resistive value R between terminals T7 and T8 of the magnetoresistance element 18 vary as shown in FIGS. 3B, 3C and 3D, respectively.

For this reason, when a voltage of a given level is applied between the terminals T1 and T4 of the magnetoresistance element 17, an A-phase signal of a voltage level V as shown in FIG. 3E which corresponds to the amount of rotation of the rotary scale 11 is generated between the terminals T3 and T4 of the magnetoresistance element 17. Similarly, when a voltage of a given level is applied between the terminals T5 and T8 of the magnetoresistance element 18, a B-phase signal of a voltage level V as shown in FIG. 3F which corresponds to an amount of rotation of the rotary scale 11 is generated between the terminals T7 and T8 of the magnetoresistance element 18.

When a voltage of a given level is applied between the terminals t1 and t4 of the magnetoresistance element 19, an A-phase signal is generated between the terminals t3 and t4 of the magnetoresistance element 19. Similarly, when a voltage of a given level is applied between terminals t5 and t8, a B-phase signal is generated between the terminals t7 and t8, assuming that the pitch $\lambda$ represents one cycle of the magnetic pattern 12 on the rotary scale 11.

According to this invention, the sensor 13 can be applied to two types of rotary scales: one for the magnetic pattern of one cycle of $2\lambda$ and the other for the magnetic pattern of one cycle of $\lambda$. Since the magnetic pattern on the rotary scale is often formed at the pitch of $2\lambda, \lambda, \lambda/2, \lambda/4, \ldots$ in an integral progression relation, the ratio between the pitch of the magnetoresistance elements 17 and 18 in the first magnetoresistance element section 14 and that of the magnetoresistance elements 19 and 20 in the second magnetoresistance element section 15 becomes more practical if it is made in an integral progression relation.

What is claimed is:

1. A displacement sensing device, comprising:
   a magnetic scale with a magnetic pattern of a first pitch of (n$\lambda$) wherein n is a selected positive integer; and
   a sensor located opposite to the magnetic scale and including two magnetoresistance element sections each comprised of a pair of magnetoresistance elements, wherein one of said element sections is formed at a pitch which operatively interacts with the first pitch so that an electric signal corresponding to a relative amount of movement between the magnetic scale and the sensor is generated by said one of said element sections according to a variation in a resistive value of each magnetoresistance element of said one of said element sections in response to the magnetic pattern on the magnetic scale;
   the pair of magnetoresistance elements forming the remaining one of said element sections being arranged at a pitch which operatively interacts with a magnetic pattern of a second pitch different from the first pitch;
   said magnetoresistance element sections being arranged so that said one of said element sections which operatively interacts with the first pitch can be selected for use independently of the other element section.

2. A measuring apparatus according to claim 1, wherein the magnetoresistance elements of the pair in one magnetoresistance element section and the magnetoresistance elements of the pair in the other magnetoresistance element section are each arranged to generate electric signals of mutually different phases within the associated element section when the associated element section is selected for use and operatively interacts with the magnetic pattern on said scale.

* * * * *